United States Patent Office 3,494,884
Patented Feb. 10, 1970

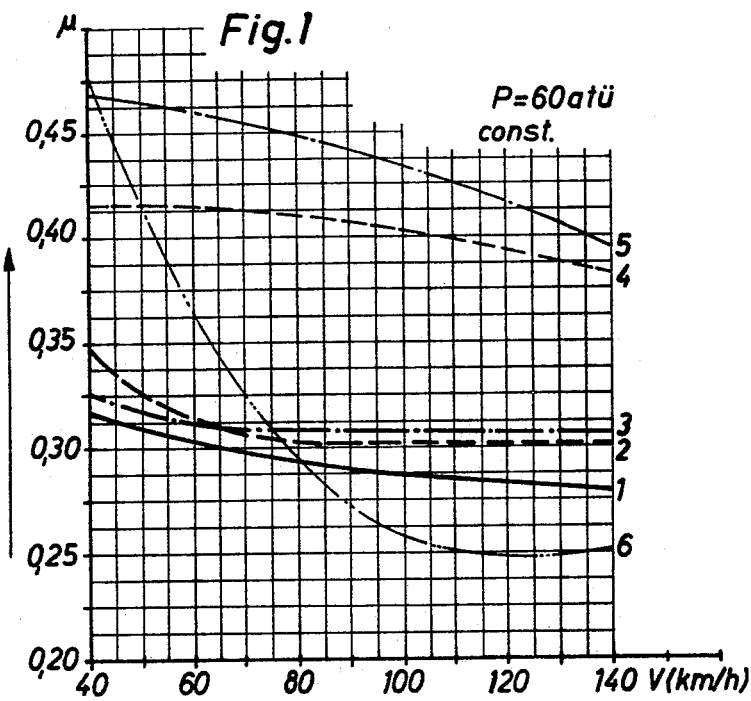
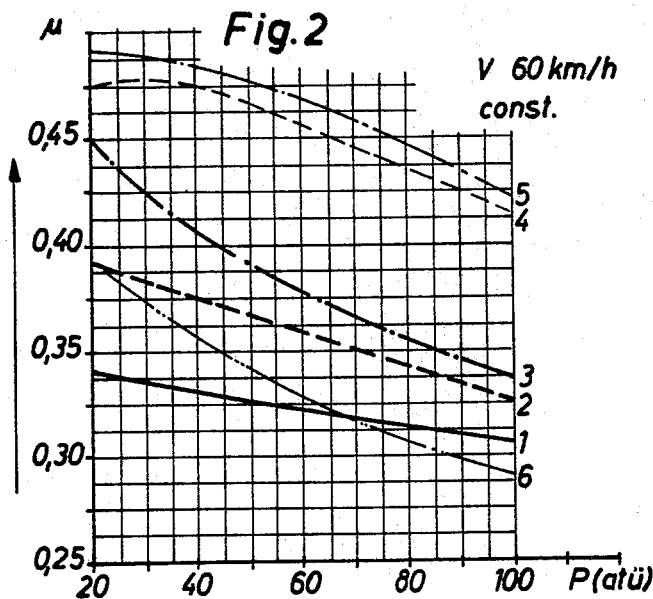

3,494,884
FRICTION LINING COMPOSITIONS
Paul Kraft, Geislingen an der Steige, Germany, assignor to Jurid-Werke GmbH, Hamburg, Germany
Filed May 27, 1964, Ser. No. 370,651
Int. Cl. C08g 51/04; C09k 3/14
U.S. Cl. 260—39          8 Claims The present invention relates to the art of friction compositions for use in clutch and brake devices, or the like, and is particularly useful in high kinetic-energy-absorbing devices.

Known friction composition linings or segments may be characterized as falling generally within two categories, namely, organic and inorganic. Organic linings consist of an organic binder, such as a heat-hardenable synthetic resin, a phenolic or cresolic resin, a synthetic rubber, or a mixture thereof containing as filler a material being of friction-producing character. Such known mixtures are hereinafter referred to as "organic material"; brake linings made therefrom generally possesses good friction-producing properties, but these become less satisfactory at extremely high temperatures or very high speeds and at high contact pressures.

Inorganic linings usually consist of sintered metallic friction material such as metal powder containing in addition a proportion of some substances such as e.g. graphite reducing the tendency to snatch or seize, and/or some substances such as e.g. silica increasing the friction-producing properties. Such brake materials naturally have a high heat resistance, and the coefficient of friction is only less influenced by the rubbing speed; however in such sintered metallic materials there is a relatively high rate of wear under given conditions in comparison with brake linings produced from the aforesaid organic materials.

Moreover, such sintered materials tend to break up at their edges and to be noisy in use, especially when subjected to high compression, as for example in the linings of disc brakes.

Therefore, it is a principal object of this invention to provide a friction composition which possesses a relatively stable or desirable coefficient of friction throughout its wear-life on the clutch, brake etc. but without tendency to break up at their edges.

A further object is to provide such a friction lining composition which, by reason of resistance to high temperatures, is especially suited for use in the linings of disc brakes.

A still further object is to provide a friction composition or article in which sintered inorganic material after having been ground into small particles is utilized as a principal friction-producing filling agent in a matrix made from said organic friction material, for use as brake or clutch linings.

A still further object is to provide a friction composition which will maintain substantially uniform friction-producing surfaces after repeated operations under high temperature conditions and in heavy duty applications.

Further objects and advantages of the present invention will be apparent from the following description, reference being had to the accompanying drawings wherein:

FIGURE 1 is a diagram showing the effect of speed on the coefficient of friction, at constant area pressure of about 60 atm.; parameter is the composition of a disc brake lining;

FIGURE 2 is a diagram showing the effect of area pressure on the coefficient of friction, at constant speed; parameter is the composition of a disc brake lining.

Broadly, the product which I have invented is a friction material composition or article which is suitable for use as a break or clutch lining, or the like and which contains a sintered inorganic material based on metallic powder which inorganic material is ground or pulverized after sintering and which pulverized sintered material is mixed with an organic friction material and is then pressed.

I have discovered that a friction material having improved frictional properties can be prepared by so incorporating granules or grains of the sintered inorganic material in the organic friction material.

A friction material according to the invention thus comprises an intimate mixture of granules of a sintered metallic friction material and an organic friction material comprising a filler and an organic binder.

Mixing of the organic material with the sintered inorganic material in any desired proportion is practicable. For the purpose of the present invention preferred proportions by weight, which are particularly useful in practice and provide linings with outstandingly improved braking properties are 10% to 70%, preferably 30% to 45% of sintered inorganic material, and 30% to 90%, preferably 55% to 70% of the organic friction material comprising binder and filler.

The uniformity of the braking properties of the linings made from the brake material is dependent on the uniformity of the mixture of the components. Particularly good results are obtained with a mixture in which the sintered inorganic material has a grain size of 0.1 to 5 mm.

According to the present invention the sintered inorganic material used may consist of any of the common sintered inorganic brake materials consisting basically of a metal powder, such as copper, lead, tin or iron, and containing in addition friction-producing materials such as ceramic substances e.g. $SiO_2$, $Al_2O_3$, Carborundum, corundum, and the like substances. Furthermore, natural graphite and/or molybdenum disulphide may also be included, and an example formulation containing these ingredients may consist as follows in approximate percentage by weight: copper about 23% to 82%, zinc and/or tin up to about 36%, lead up to about 18%, graphite and/or molybdenum disulphide up to about 20%, abrasive material including silica, clay, Carborundum, corundum, and aluminum oxide, about 2% to 48%. Other ingredients such as a nickel, cobalt, iron, and brass may be substituted for the copper.

For the organic material component, substantially any known organic binders, such as phenol formaldehyde resins, and the known fillers such as asbestos, mineral powder, glass particles, mineral wool may be used, and an example formulation containing these ingredients may consist as follows in approximate percentage by weight: about 10% to 40% of a binder such as natural or synthetic rubber, phenol-formaldehyde resin, urea-formaldehyde resin, cresol-resin, about 30% to 90% of a filler such as asbestos, glass wool, metallic strands, barytes, or a metal oxide, and the like material. Other ingredients such as an abrasive material including silica, clay, Carborundum, corundum and aluminum oxide may be added in an approximate amount of up to about 55% and graphite and/or molybdenum disulphide ranging from 1% to about 5% may be present.

In the preferred method according to the invention of making the new and improved friction material, a mixture in the form of plates, strips or blocks of the inorganic sinter components is sintered together, the plates, strips or blocks built up by sintering are then ground into pieces by crushing or pulverizing them and are granulated to form particles preferably with an average diameter of 0.1 to 5 mm., the granules are intimately mixed in the aforesaid preferred proportions with the filler, and then with the binder, the resultant mixture is pressed either cold or hot into shape and then heated, under pressure, if desired. The temperature and pressure used must in all cases be selected according to the nature of the organic binder used, not only according to the requirements of the inorganic sintered materials present. Typical conditions which may be used to produce a brake or clutch lining are temperatures ranging from about 140° C. to about 170° C. and pressures ranging from about 170 atm. to about 250 atm.

The results of experiments performed make it probable that some kind of physico-chemical reciprocal action between the thus mixed materials occurs, which possibly results or is activated by the surface changes of the metal particles following the sintering. This is also shown by the fact that if the grain size of the granulated sintered material is very small (less than that of fine dust, approximately 0.1 mm.) the advantageous properties are no longer obtained; obviously the individual sintered particles must each have a sufficiently large surface area effective in friction-producing so that it cannot become inoperative by the organic material embedding it.

If however the suitably granulated inorganic sintered material is mixed with the filler and binder and afterworked, brake linings with high strength and high compression resistance are obtained. Linings made from pure sintered material do indeed already possess advantageous properties, such as good heat resistance, good recovery of the coefficient of friction after heating up, and good heat conductivity. However, a high heat conductivity is not desired for all purposes, and indeed is a disadvantage in some instances, if for example the brake operating piston, washers and brake fluids are heated up too much in consequence of high braking temperatures and thus the operation of the brake is affected.

In the friction materials according to the invention, the heat conductivity is regulated at a useful value by the inclusion of sufficient amounts of organic material, at least 20% to 25% by weight of the total amount of material. Furthermore, by the choice of suitable proportions for the mixture, a coefficient of friction can be obtained which is higher than those obtainable with the prior pure inorganic sintered materials (maximum values of 0.4 to 0.5), or with prior organic materials. The material according to the invention also suffers less from slipping than do the prior sintered materials. The material according to the invention has very good recovery properties after considerable heat stresses, i.e., its braking properties are not impaired by heating. The full value of the coefficient of friction is also shown at the start and with cold brakes; this is particularly important and advantageous in the use of disc brakes, in which when made from prior organic mixtures the coefficient of friction remains constant and reaches its final value only after a long initial period, after formation of a closed layer of frictional carbon over the braking surface.

The accompanying drawing shows the relationship between the coefficient of friction and variation in the properties of sintered and organic components with respect to its proportions; values are also shown for the corresponding pure organic and pure sintered inorganic bake materials, for compaison. The coefficients of friction shown are mean values, measured on a disc brake before and after values, to 500° C. In the drawing, the values of the coefficient of friction is shown on the ordinate, whereas the abscissa shows the speed or the area pressure, respectively.

The material tested were made by mixing together in various proportions the following two compositions.

Organic material: Parts by weight
Phenol-formaldehyde condensation resin _____ 1.0
Asbestos, short-fibred _____ 2.0
Friction-increasing additives _____ 1.3
Metal oxides _____ 1.1
Graphite _____ 0.38

Sintered inorganic material: Parts by weight
Copper _____ 3.0
Tin _____ 0.8
Lead _____ 0.4
Graphite _____ 0.6
Molybdenum disulphide _____ 0.46
Silica _____ 0.45

These materials were combined for the experiments in the following ratios (percent by weight):

| Test No. | Sintered material | Organic material |
|---|---|---|
| 1 | 0 | 100.00 |
| 2 | 13.02 | 86.98 |
| 3 | 23.04 | 76.93 |
| 4 | 33.30 | 66.70 |
| 5 | 42.90 | 57.10 |
| 6 | 100.00 | 0 |

Nos. 1 and 6 are comparative and do not represent the invention.

Referring to FIG. 1, this is a graph of the coefficient of friction ($\mu$) plotted against velocity (V) shown with the aforementioned compositions of the materials, at a constant surface pressure of 60 atm. It can be seen that the average value of the coefficient of friction is substantially increased in comparison with that of the pure organic material, and also the constancy of the braking coefficient at speeds between 0 and 140 km./hour is substantially improved with respect to that of the pure sintered materials.

Referring to FIG. 2, in which the coefficient of friction ($\mu$) is plotted against the surface pressure ($p$) at a constant speed of 80 km./hour for the various compositions of the material as to tests Nos. 1 through 6, it will also be seen that the coefficient of friction is improved by the use of the material according to the invention.

The specific formulations cited in this specification are merely examples of useful combinations of ingredients, and are not intended to detract from the breadth of the concept that constitutes applicants' invention, i.e., the concept that an improved friction material can be provided by combining suitable amounts of an inorganic friction material which has been sintered and ground into pieces and an organic friction material.

Although several embodiments of the invention have been illustrated and described, various changes in the form and relative arrangements of the parts or ingredients may be made to suit requirements.

I claim:
1. A brake or clutch friction composition which consists of an intimate mixture of grains of a sintered and then pulverized inorganic friction material comprising a metallic binder selected of the group consisting of copper, zinc, tin, lead, nickel, cobalt, iron, and brass, and containing an abrasive ingredient being selected of the group consisting of silica, aluminum oxide, Carborundum, corundum, together with an organic friction material comprising an organic binder being selected of the group consisting of natural or synthetic rubber, phenol formaldehyde resin, and containing a filler being selected of the group consisting of asbestos, glass particles, metallic strands, barytes, metal oxides.

2. A brake or clutch friction composition which consists of an intimate mixture of 10% by weight to 70% by weight of a sintered and then ground inorganic friction material comprising a metallic binder and containing an abrasive ingredient, together with 90% by weight to 30% by weight of an organic friction material comprising an organic binder and containing a filler.

3. A brake or clutch friction composition which consists of an intimate mixture of 30% by weight to 45% by weight of a sintered and then pulverized inorganic friction material comprising a metallic binder selected of the group consisting of copper, zinc, tin, lead, nickel, cobalt, iron, and brass, and containing an abrasive ingredient being selected of the group consisting of silica, aluminum oxide, Carborundum, corundum, together with 70% by weight to 55% by weight of an organic friction material comprising an organic binder being selected of the group consisting of natural or synthetic rubber, phenol formaldehyde resin, and containing a filler being selected of the group consisting of asbestos, glass particles, glass wool, metallic strands, barytes, metal oxides.

4. The brake or clutch friction composition of claim 3, wherein the size of the grains of said sintered and then pulverized inorganic friction material is of 0.1 to 5 mm.

5. A brake or clutch friction composition which consists of an intimate mixture of 30% by weight to 45% by weight of a sintered and then pulverized inorganic friction material comprising a metallic binder being selected of the group consisting of copper, zinc, tin, lead, nickel, cobalt, iron, and brass, and containing an abrasive substance being selected of the group consisting of silica, aluminium oxide. Carborundum, corundum, and in addition containing a substance being selected of the group consisting of graphite and molybdenum disulphide, the average diameter of the particles of said sintered material being of the order of about 0.1 to 5 mm., together with 70% by weight to 55% by weight of an organic friction material comprising an organic binder being selected of the group consisting of natural or synthetic rubber, phenol formaldehyde resin, and containing a filler being selected of the group of asbestos, glass particles, glass wool, metallic strands, barytes, metal oxides.

6. The method of making a new and improved friction material characterized in that a common inorganic friction material comprising a metallic binder being selected of the group consisting of copper, zinc, tin, lead, nickel, cobalt, iron, and brass, and containing an abrasive substance being selected of the group consisting of silica, aluminum oxide, Carborundum, corundum, and in addition containing a substance being selected of the group consisting of graphite and molybdenum disulphide, is sintered and is then made into pieces the average diameter of which being of the order of 0.1 to 5 mm., said particles of the sintered inorganic material are intimately mixed with a common organic friction material comprising an organic binder being selected of the group consisting of natural or synthetic rubber, phenol formaldehyde resin, and containing a filler being selected of the group consisting of asbestos, glass particles, glass wool, metallic fibres, barytes, metal oxides, and said mixture is compressed.

7. The method of claim 6, wherein said inorganic friction material is present in an amount of about 30 to 45% by weight and said organic friction material is present in an amount of about 55 to 70% by weight, and said mixture is compressed with a pressure ranging from 170 to 250 atm. under the influence of a temperature ranging from about 140° C. to about 170° C.

8. A brake or clutch frictional composition comprising an intimate mixture of sintered and subsequently pulverized inorganic frictional material, said inorganic frictional material comprising a metallic binder and an abrasive substance, said sintered and subsequently pulverized material comprising 30% to 45% by weight of said composition.

References Cited

UNITED STATES PATENTS

| | | |
|---|---|---|
| 2,369,502 | 3/1940 | Walker. |
| 2,971,615 | 2/1961 | Ryznar. |
| 3,210,303 | 10/1965 | Biggs. |
| 3,079,243 | 2/1963 | Ueltz _____ 51—298 |
| 2,725,286 | 11/1955 | Coes _____ 51—298 |

FOREIGN PATENTS 830,322   3/1960   Great Britain.

MORRIS LIEBMAN, Primary Examiner

U.S. Cl. X.R.

51—298; 260—41, 41.5